United States Patent [19]

Miyake et al.

[11] 4,444,843

[45] Apr. 24, 1984

[54] SELF-BONDING MAGNET WIRES

[75] Inventors: Masayoshi Miyake; Isao Ueoka; Munetaka Kawaguchi, all of Aichi, Japan

[73] Assignee: Sumitomo Electric Industries, Ltd., Osaka, Japan

[21] Appl. No.: 401,510

[22] Filed: Jul. 26, 1982

[30] Foreign Application Priority Data

Jul. 24, 1981 [JP] Japan ............................... 56-116548

[51] Int. Cl.[3] ......................... B32B 27/00; H01B 7/00

[52] U.S. Cl. ............................... 428/383; 174/120 C; 174/120 SR

[58] Field of Search ............... 428/375, 379, 383, 413; 252/52 A, 52 R; 174/110 SR, 110 E, 110 A, 120 SR, 120 C

[56] References Cited

U.S. PATENT DOCUMENTS

| | | | |
|---|---|---|---|
| 3,434,087 | 3/1969 | Hofmann | 124/110 E |
| 3,953,649 | 4/1976 | Suzuki et al. | 428/383 |
| 4,031,287 | 6/1977 | Suzuki et al. | 428/375 |
| 4,072,795 | 2/1978 | Noonan | 428/379 |
| 4,088,809 | 5/1978 | Elbling et al. | 428/379 |

*Primary Examiner*—Lorraine T. Kendell
*Attorney, Agent, or Firm*—Sughrue, Mion, Zinn, Macpeak and Seas

[57] ABSTRACT

A self-bonding magnet wire comprising a conductor having a baked overcoat applied over another insulation layer is disclosed. Said overcoat is applied from an enamel composition consisting essentially of a polyhydroxyether or sulfonated polyhydroxyether having a straight alkyl group of 21 or more carbon atoms connected to a terminal or a side chain of at least one molecule of the polymer.

4 Claims, No Drawings

SELF-BONDING MAGNET WIRES

BACKGROUND OF THE INVENTION

The present invention relates to a self-bonding magnet wire having good self-lubricating properties.

Manufacturers of electric apparatuses have conventionally omitted or simplified the varnish impregnating step by using a "self-bonding magnet wire" which comprises an enameled conductor having an outer coating that can be fused to an adjacent wire with heat or a solvent. Recently, these manufacturers have come to use high-speed automatic winding machines to increase the speed of the production line. The increased line speed at first seemed to cut the production cost by a substantial degree. However, as it turned out, the gains in production were more than offset by costs incurred as a result of damage caused to the wire and coating by friction and other mechanical stress during the high-speed winding. The damaged coating can effect bonding of adjacent wires such that wires wound tightly into a coil easily come loose and the intended performance of the self-bonding magnet wires is impaired significantly. As another problem, if such damaged wire is assembled in an electric machine, layer shorting (short-circuiting between wires) occurs and the loss factor is increased to an undesirably high level. To minimize the mechanical damage to the self-bonding magnet wire, wires having good self-lubricating properties have been demanded. This demand should be met not only by the automatic winder but also when self-bonding magnet wires are inserted manually into a small slot in a motor.

Since self-bonding magnet wires themselves do not have good self-lubricating properties, the low slip properties between individual wires, between wires and the winder and between wires and the electric machine into which they are assembled cause mechanical damage to the self-bonding layer. Furthermore, the friction may damage the wire enamel or decrease the efficiency of the winding and assembling operations. This problem has partly been solved by coating the self-bonding magnet wire with a layer of various liquid lubricants such as liquid paraffin and refrigerator oil. But the resulting wires still do not have satisfactory lubricating and slip properties and cannot be handled efficiently in manual operation, and what is more, they cannot be wound into a neat coil for making, e.g., a transformer. As the speed of the automatic winder has been increased further and the use of an inserter to achieve a higher space factor is more common these days, insufficient bonding of the magnet wires has become another factor which increases the chance of layer shorting. Improving the self-lubricating properties of wires by applying a large quantity of liquid lubricants is not very effective. In addition, the use of such lubricants causes more dirt to collect on the wires and the bonding strength of adhesive tape used to fix the end of the coil is adversely affected.

Attempts have been made to eliminate these defects by coating the enameled wires with solid lubricants such as solid paraffin and carnauba wax having better lubricating properties than liquid lubricants. To form a uniform coating, the solid lubricants are usually applied to the wires from a solution having a few percent of the lubricant dissolved in solvents such as petroleum benzine, toluene and xylene. However, the use of a large quantity of low-boiling solvents is not only hazardous to human health but with some types of wire, the self-bonding layer dissolves or swells in the solvent. This causes total or partial loss of bonding ability or may cause creases to develop in the enamel layer. Therefore, the coating of solid lubricants can only be applied to limited types of electric wires.

Another method that has been proposed for providing self-bonding magnet wires with high lubricating properties is to use enamel compositions containing synthetic resins having good lubricating properties such as polyethylene, polypropylene and polytetrafluoroethylene, as well as silicone oil, fluorine containing surfactants, and liquid and solid lubricants such as paraffin wax, carnauba wax and montan wax. However, solid lubricants and synthetic resins such as polyethylene, polypropylene and polytetrafluoroethylene are insoluble or sparingly soluble in solvents for the enamel and are difficult to disperse in the enamel uniformly, and the resulting enamel is not highly soluble. What is more, these solid lubricants and synthetic resins are not highly miscible with the self-bonding materials in the enamel. Therefore, it is difficult to disperse them in the self-bonding layer uniformly. Accordingly, the resulting coating does not have a good appearance. Liquid lubricants in the enamel provide a coating whose slip and self-lubricating properties are as low as those of the coating formed by applying them onto the wire.

SUMMARY OF THE INVENTION

As a result of various studies to eliminate the above defects of the conventional product, the present inventors have found that a desired self-bonding magnet wire can be produced by applying to the conductor, through another insulation, an enamel composition composed mainly of a polyhydroxyether or sulfonated polyhydroxyether at least one molecule of which has a straight alkyl group of 21 or more carbon atoms at a terminal or in a side chain, and baking the same. The self-bonding magnet wire of the present invention has better appearance and self-lubricating properties than the wire that is produced by coating the insulation layer with an enamel containing solid lubricants or synthetic resins.

DETAILED DESCRIPTION OF THE INVENTION

The insulation coating through which the enamel according to the present invention is applied to the conductor may be made of any material such as polyurethane, polyvinyl formal, polyester, polyester imide, polyhydantoin, polyamideimide, polyester amideimide, polyimide, polyhydantoin ester and polyester amide. The polyhydroxyether or sulfonated polyhydroxyether used in the present invention comprises a polyhydroxyether or sulfonated polyhydroxyether that makes up the polymer chain and a straight alkyl group of 21 or more carbon atoms that makes up a terminal or side chain to at least one of the molecules of that polymer. The resin that makes up the polymer chain may be bonded to the terminal or side chain straight alkyl group in any suitable fashion such as amido bond, ester bond, urethane bond or urea bond. The straight alkyl group bonded to a terminal of or side chain in the resin must have at least 21 carbon atoms to provide good lubricating properties. The desired lubricating properties are not achieved if said alkyl group has less than 21 carbon atoms. Briefly stated, if the alkyl group is represented by $—CH_2)_{n-1}CH_3$, n must be 21 or more. The alkyl group is preferably in a completely linear form, but it may be partially branched as long as the straight portion has at least 21 carbon atoms.

The terminal or side chain alkyl group is preferably contained in the polymer in an amount of from 0.3 to 3.5% by weight. If its amount is less than 0.3% by weight, the desired lubricating properties are not obtained, and if its amount exceeds 3.5% by weight, the resulting enamel does not remain stable during storage and the electric wire coated with such enamel does not have the desired appearance or mechanical properties.

The polymer chain of the polyhydroxyether or sulfonated polyhydroxyether used in the present invention is prepared by reacting bisphenols and diepoxides thereof. The bisphenols are typically represented by the formula:

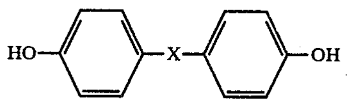

(wherein X is —S—, —$SO_2$—, —CO—, —O—, —$CH_2$—, —$C_2H_4$— or —$C(CH_3)_2$—; and hydrogen in the benzene ring may be substituted by a lower alkyl group or halogen), and specific examples are 2,2-bis(4-hydroxyphenyl)propane, 4,4'-dihydroxyphenylmethane, 4,4'-dihydroxyphenylsulfone, 3,3'-dimethyl-4,4'-dihydroxydiphenylsulfone and 2,2-bis(4-hydroxy-3,5-dibromophenyl)propane with 2,2-bis(4-hydroxyphenyl)propane and 4,4'-dihydroxyphenylsulfone being preferred. The diepoxides of bisphenol are prepared by reacting the above listed bisphenols with epihalohydrin in the presence of a basic catalyst and are typically represented by the formula:

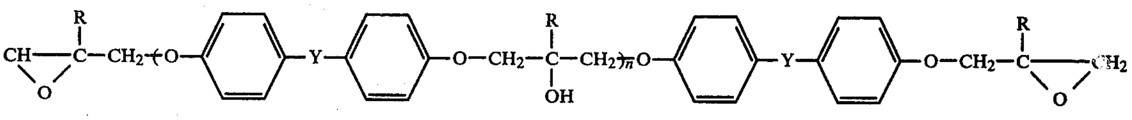

wherein Y is —S—, —$SO_2$—, —CO—, —O—, —$CH_2$—, —$C_2H_4$— or —$C(CH_3)_2$13 , and hydrogen in the benzene ring may be substituted by a lower alkyl group or halogen. The degree of polymerization of the diepoxide can be controlled by changing the molar ratio of bisphenols to epihalohydrin. Typical commercial diepoxides are Epikote #828, 834, 1001, 1004, 1007 and 1009 produced by Shell International Chemical Corp., DER 330, 331, 332, 334 and 542 produced by the Dow Chemical Company, Epichron 145 and 123 from Dainippôn Ink and Chemicals, Inc., and YD-019 and YD-020 produced by Toto Kasei K.K. The degree of polymerization, n, of these and other commercial epoxides varies according to the conditions for their manufacture and it also has some variance within the same product. Therefore, it is desired that the epoxy equivalent of these diepoxides be measured before use.

The polyhydroxyether or sulfonated polyhydroxyther used in the present invention is such that at least one molecule thereof has a straight alkyl group of 21 or more carbon atoms at a terminal or in a side chain. In one method of introducing a straight alkyl group of 21 or more carbon atoms at a terminal, a bisphenol and its diepoxide for producing the polymer chain (i.e., polyhydroxyether or sulfonated polyhydroxyether) are reacted with a compound having in the molecule a straight alkyl group of 21 or more carbon atoms and a functional group capable of reacting with the bisphenol or its diepoxide. One method of introducing a straight alkyl group of 21 or more carbon atoms in a side chain comprises first reacting the bisphenol and its diepoxide to form a polyhydroxyether or sulfonated polyhydroxyether, and then reacting the polymer with a compound having a functional group capable of reacting with the hydroxyl group in the polymer and a straight alkyl group of 21 or more carbon atoms. Of course, the two methods may be combined to introduce a straight alkyl group of 21 or more carbon atoms both at a terminal and in a side chain.

Examples of compounds used to introduce a straight alkyl group of 21 or more carbon atoms at a terminal or in a side chain of at least one molecule of the polyhydroxyether or sulfonated polyhydroxyether include aliphatic acids, alkyl esters and acid halides thereof, as well as amines with aliphatic acids being preferred. Illustrative examples of aliphatic acids include docosanoic acid, tricosanoic acid, tetracosanoic acid, pentacosanoic acid, hexacosanoic acid, heptacosanoic acid, octacosanoic acid, nonacosanoic acid and triacontanoic acid, and derivatives of these aliphatic acids are esters and acid halides. Illustrative examples of amines include heneicosylamine, docosylamine, tricosylamine, pentacosylamine, hexacosylamine and octacosylamine. These compounds need not be used individually and may be used in admixture. For instance, Hoechst Wax S sold by Hoechst Japan, Ltd. that is based on montan wax acid (chain length: C 28-32) may be used.

The reaction for producing the polyhydroxyether or sulfonated polyhydroxyether used in the present invention may be effected either in the absence of solvents or in the presence of a solvent. However, to achieve easier control of the reaction process, a solvent is preferably used. Suitable examples of solvents include ketones such as methyl isobutyl ketone, cyclohexanone, acetophenone and benzophenone; aldehydes such as furfural; nitriles such as acetonitrile, phenyl acetonitrile, propanedinitrile and benzonitrile; nitro compounds such as nitrobenzene, 1-chloro-2-nitrobenzene and 1-chloro-3-nitrobenzene; sulfoxides such as dimethyl sulfoxide; and sulfones such as cyclotetramethylenesulfone.

Catalysts may be used to accelerate the reaction. Effective catalysts include organic bases such as aliphatic tertiary amines, 1,8-diazabicyclo[5,4,0]-undecene-7 and pyridine, and aliphatic primary or secondary amines or aromatic amines are not highly effective in providing a sufficient molecular weight to make a strong film. The catalysts are used in an amount of 0.01 to 10 mol% of the phenols, with the range of from 0.02 to 5 mol% being preferred.

The reaction temperature is preferably between 80° to 200° C. Temperatures outside this range may also be used, and if necessary, solution polymerization may be effected under pressure at a temperature higher than the boiling point of the solvents. Polymers having a higher degree of polymerization provide self-bonding magnet wires with better characteristics. The polymer desirably has a reduced specific viscosity ($\eta sp/C$) of 0.3 dl/g or more as measured in 0.5% m-cresol.

The solvents used in the production of the above mentioned polymer can also be used as solvents for making the enamel used in the present invention. Other solvents such as m-cresol, N,N-dimethylformamide, N-methylpyrrolidone, methyl ethyl ketone, xylene and naphtha may be used to control the viscosity and solubility of the polymer solution. Additional improvement in the characteristics of the self-bonding magnet wire can be achieved by incorporating in the enamel a suitable amount of a thermoplastic resin, e.g., polyester, polysulfone, or polyamide, as well as a suitable amount of a stabilized polyisocyanate or a thermosetting resin, e.g., phenol resin, melamine resin, urea resin, alkyl resin or epoxy resin, or a suitable amount of one or more additives, e.g., boron trifluoride-amine complex, dyes, and organic or inorganic fillers. The enamel containing these additional components are also included within the scope of the present invention.

The present invention is now described in greater detail by reference to the following examples and comparative examples which are given here for illustrative purposes only and are by no means intended to limit its scope. In Example 3 and Comparative Example 3, the reduced specific viscosity ($\eta$nsp/C) of the thermoplastic polymers having a sulfonate group in their molecule was measured with 0.5 g of the polymer solution in 100 ml of m-cresol at 30° C.

The bond strength of the enameled wires prepared in the examples and comparative examples was determined in accordance with the helical coil test method of ASTM D 2519: a wire sample was closely wound around a mandrel (diameter: 5.0 mm) into a helical coil 70 mm long which was heated at 180° C. for 20 minutes under a load of 125 g. The coefficient of static friction was measured by the following method in terms of the coefficient of static friction between self-bonding magnet wires: two parallel magnet wires were placed on a horizontal plane; a metal block to the bottom of which two parallel magnet wires were fastened was placed on said horizontal plane so that the respective pairs of wires crossed each other at a right angle; the metal block was moved along the two wires on the horizontal plane; and the minimum load necessary for moving the block was divided by the weight of the block to determine the coefficient of static friction of the wires.

COMPARATIVE EXAMPLE 1

A mixture of 500 g of a commercial polyhydroxyether (Phenoxy PKHH produced by Union Carbide Corporation) and 1,500 g of a mixed solvent of m-cresol and petroleum naphtha (Swasol #1000 from Maruzen Petrochemical Co., Ltd.), the weight ratio of m-cresol to naphtha being 2:1, was charged in a 3,000 ml-flask with a thermometer, a stirrer and a cooling tube, and the mixture was stirred at 100° C. for 2 hours to form a polyhydroxy enamel composition.

A commercial insulating polyester enamel composition ("Delacoat E-220G" produced by Nitto Electric Industrial Co., Ltd.) was applied to a copper wire (diameter: 0.5 mm) in five laeyrs which were baked individually in a baking furnace. Then, the outermost layer of the insulation was coated with three layers of the previously prepared polyhydroxyether enamel, which were baked under the same conditions for the polyester enamel to make a self-bonding magnet wire.

COMPARATIVE EXAMPLE 2

Using the reactor of Comparative Example 1, 500.1 g of Epikote #1001 (epoxy equivalent=500.1) produced by Shell International Chemicals Corp. and 114.2 g (0.5 mole) of bisphenol A were dissolved in 114.3 g of a mixed solvent of cyclohexanone and xylene (weight ratio=8:2), and then 3.7 g of 1,8-diazabicycloundecene-7 was added. The reaction mixture was heated at 150° C. for 2 hours and when it became viscous, the heat was removed and 1,228.6 g of m-cresol was added to stop the reaction. A pale yellow transparent polyhydroxyether enamel composition was obtained. The enamel was mixed intimately with 18.4 g of octacosanoic acid under stirring at 80° C. for 30 minutes to make a polyhydroxyether enamel composition containing octacosanoic acid.

The enamel was applied to a copper conductor as in Comparative Example 1 to make a self-bonding magnet wire. When the enamel was left at room temperature for one day, the insoluble matter precipitated and the enamel turned heterogeneous and opaque. Upon standing for one month, the enamel became more heterogeneous and opaque and lost its effectiveness as enamel.

EXAMPLE 1

Using the reactor of Comparative Example 1, 500.1 g of Epikote #1001 (epoxy equivalent=500.1) produced by Shell International Chemicals Corp., 109.2 g of bisphenol A and 18.4 g of octacosanoic acid were dissolved in 127.7 g of a mixed solvent of cyclohexanone and xylene (weight ratio=8:2), and then 3.5 g of 1,8-diazabicycloundecene-7 was added. The reaction mixture was heated at 150° C. until it became viscous when the heat was removed and 1,255.4 g of m-cresol was added to stop the reaction. The resulting polyhydroxyether enamel having a straight alkyl group of 27 carbon atoms at a terminal of at least one molecule was a pale yellow, homogeneous and transparent solution which remained so even after a one-week storage at room temperature. The enamel was applied to a copper wire as in Comparative Example 1 to make a self-bonding magnet wire.

EXAMPLE 2

Using the reactor of Comparative Example 1, 390.2 g of Epikote #828 (epoxy equivalent=185.1) produced by Shell International Chemicals Corp., 228.3 g of bisphenol A and 9.3 g of Hoechst Wax S (montan wax acid with a chain length of $C_{28-32}$) from Hoechst Japan, Ltd. were dissolved in 127.8 g of cyclohexanone, and then 9.2 g of tri-n-butylamine was added. The reaction mixture was heated at 150° C. until it became viscous when the heat was removed and 1,255.6 g of a mixed solvent of m-cresol, p-cresol and xylene (weight ratio=5:2:3) was added to stop the reaction. A polyhydroxyether enamel composition having a straight alkyl group of 27 to 31 carbon atoms at a terminal of at least one molecule was obtained. The enamel was applied to a copper wire as in Comparative Example 1 to make a self-bonding magnet wire.

COMPARATIVE EXAMPLE 3

A mixture of 185.1 g of Epikote #828 (epoxy equivalent=185.1) produced by Shell International Chemicals Corp. and 121.4 g (0.485 mole) of bisphenol S (m.p. 247°-249° C.) from Konishi Kagaku K.K. were dissolved in 306.5 g of cyclohexanone in a round bottom flask with a thermometer, stirrer and cooling tube, and then 4.6 g of tri-n-butylamine was added. Under stirring, the mixture was heated to 150° C. at which temperature it was subjected to reaction for 1 hour and 45 minutes. When the reaction mixture becomes viscous, the heat was removed and 406.2 g of m-cresol was added to stop the reaction. The resulting pale yellow sulfonated polyhydroxyether enamel had a reduced specific viscosity of 0.45 $\eta sp/C$.

A commercial polyester imide enamel composition ("Isomid" produced by Nisshoku-Schenectady Co., Ltd.) was applied to a copper wire (diameter: 0.5 mm) in seven layers which were baked in a baking furnace. Then, the outermost layer of the insulation was coated with three layers of the sulfonated polyhydroxyether enamel which were baked under the same conditions for the polyester imide enamel, to thereby make a self-bonding magnet wire.

EXAMPLE 3

Using the reactor of Comparative Example 3, 185.1 g of Epikote #828 (epoxy equivalent=185.1) produced by Shell International Chemicals Corp., 121.4 g of Bisphenol S produced by Konishi Kagaku K.K. and 4.6 g of Hoechst Wax S from Hoechst Japan, Ltd. (montan wax acid with a chain length of $C_{28-32}$) were dissolved in 311.1 g of cyclohexanone, and then 4.6 g of tri-n-butylamine was added. Under stirring, the mixture was heated to 150° C. at which temperature, it was subjected to reaction for 2 hours. When the reaction mixture became viscous, the heat was removed and 412.3 g of m-cresol was added to stop the reaction. A sulfonated polyhydroxyether enamel composition having a straight alkyl group of 27 to 31 carbon atoms at a terminal of one molecule was obtained. The enamel had a reduced specific viscosity of 0.42 $\eta sp/C$. The enamel was applied to a copper wire as in Comparative Example 3 to make a self-bonding magnet wire.

The characteristics of the self-bonding magnet wires prepared in Comparative Examples 1 to 3 and Examples 1 to 3 are shown in Table 1.

TABLE 1

| | Insulation Coat Thickness (mm) | Self-Bonding Layer Thickness (mm) | Flexibility of Coat Wound around a Rod of Same Diameter | Appearance of Self-Bonding Layer | Coefficient of Static Friction | Bonding Strength At Room Temp. (kg) | Bonding Strength At 100° C. (kg) | Bonding Strength At 150° C. (g) | Flexibility of Coat Wound around a Rod of Same Diameter (when exposed to 90% RH, 40° C. for 48 hrs.) |
|---|---|---|---|---|---|---|---|---|---|
| Comp. Ex. 1 | 0.024 | 0.013 | good | good | 0.43 | 6.9 | 2.6 | | good |
| Comp. Ex. 2 | 0.024 | 0.0125 | good | fair | 0.09 | 5.8 | 1.8 | | cracked |
| Ex. 1 | 0.024 | 0.013 | good | good | 0.05 | 7.1 | 2.0 | | good |
| Ex. 2 | 0.024 | 0.013 | good | good | 0.08 | 6.7 | 2.1 | | good |
| Comp. Ex. 3 | 0.023 | 0.015 | good | good | 0.31 | 6.8 | | 240 | good |
| Ex. 3 | 0.023 | 0.015 | good | good | 0.06 | 6.5 | | 230 | good |

As the table shows, the self-bonding magnet wires prepared according to the present invention had much lower coefficient of static friction and thus better self-lubricating properties than the conventional products. Further, it can be seen that the self-bonding magnet wires of the present invention had not only excellent appearance and flexibility but also bond strength as high as that of magnet wires conventionally produced and hence were proved to have a great potential for industrial use.

While the invention has been described in detail and with reference to specific embodiments thereof, it will be apparent to one skilled in the art that various changes and modifications can be made therein without departing from the spirit and scope thereof.

What is claimed is:

1. A self-bonding magnet wire, comprising:
an insulated conductor; and
a coating over said insulated conductor, the coating being formed by applying and baking an enamel composition consisting essentially of a polyhydroxyether polymer having a straight chain alkyl group of at least 21 carbon atoms connected to at least one molecule of the polymer at a terminal position or to a side chain of the polymer, said straight chain alkyl group being present in the polymer in an amount of from 0.3 to 3.5% by weight.

2. A self-bonding magnet wire, comprising:
an insulated conductor; and
a coating over said insulated conductor, the coating being formed by applying and baking an enamel composition consisting essentially of a sulfonated polyhydroxyether polymer having a straight chain alkyl group of at least 21 carbon atoms connected to at least one molecule of the resin at a terminal position or to a side chain of the polymer, said straight chain alkyl group being present in the polymer in an amount of from 0.3 to 3.5% by weight.

3. A self-bonding magnet wire, as claimed in claim 1, wherein the polyhydroxyether polymer is prepared by reacting:
(i) a diepoxide of a bisphenol;
(ii) a compound selected from the group consisting of bisphenol A and bisphenol S; and
(iii) a straight chain carboxylic acid having a straight alkyl group of 21 or more carbon atoms in the molecule.

4. A self-bonding magnet wire, as claimed in claim 2, wherein the sulfonated polyhydroxyether polymer is prepared by reacting:
(i) a diepoxide of a bisphenol;
(ii) a compound selected from the group consisting of bisphenol A and bisphenol S; and
(iii) a straight chain carboxylic acid having a straight chain alkyl group of 21 or more carbon atoms in the molecule.

* * * * *